(12) United States Patent
Woo et al.

(10) Patent No.: US 12,045,906 B2
(45) Date of Patent: Jul. 23, 2024

(54) CONTROLLING THE OPERATION OF A PERSONAL MOBILITY IN A RENTAL SERVICE

(71) Applicants: Hyundai Motor Company, Seoul (KR); Kia Corporation, Seoul (KR)

(72) Inventors: Jae Yul Woo, Seoul (KR); Soobin Kim, Seoul (KR); Seunghyun Woo, Seoul (KR); Rowoon An, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 43 days.

(21) Appl. No.: 17/483,048

(22) Filed: Sep. 23, 2021

(65) Prior Publication Data

US 2022/0108415 A1 Apr. 7, 2022

(30) Foreign Application Priority Data

Oct. 7, 2020 (KR) .................. 10-2020-0129239

(51) Int. Cl.
| | |
|---|---|
| *G06Q 50/43* | (2024.01) |
| *B62H 5/00* | (2006.01) |
| *G06Q 10/02* | (2012.01) |
| *G06Q 20/40* | (2012.01) |
| *G06Q 30/0283* | (2023.01) |
| *G06Q 30/0645* | (2023.01) |
| *G06Q 50/40* | (2024.01) |
| *G06V 40/70* | (2022.01) |
| *G07B 15/02* | (2011.01) |
| *G07C 5/00* | (2006.01) |

(52) U.S. Cl.
CPC .............. *G06Q 50/40* (2024.01); *B62H 5/00* (2013.01); *G06Q 10/02* (2013.01); *G06Q 20/40145* (2013.01); *G06Q 30/0284* (2013.01); *G06Q 30/0645* (2013.01); *G06V 40/70* (2022.01); *G07B 15/02* (2013.01); *G07C 5/008* (2013.01); *G06Q 2240/00* (2013.01)

(58) Field of Classification Search
CPC .... G06Q 50/30; G06Q 10/02; G06Q 30/0645; G06Q 2240/00; G07B 15/02
USPC ........................................................ 705/13
See application file for complete search history.

(56) References Cited

U.S. PATENT DOCUMENTS

| | | | | |
|---|---|---|---|---|
| 2013/0238167 A1* | 9/2013 | Stanfield | ................ | G08G 1/095 701/2 |
| 2014/0129053 A1* | 5/2014 | Kleve | ..................... | B60R 25/24 701/2 |

(Continued)

OTHER PUBLICATIONS

Korosec, Kirsten; "Turo's new dongle will let customers instantly find and unlock cars"; https://techcrunch.com/2018/11/27/turos-new-dongle-will-let-customers-instantly-find-and-unlock-cars/; Nov. 27, 2018. (Year: 2018).*

*Primary Examiner* — Dione N. Simpson
(74) *Attorney, Agent, or Firm* — Slater Matsil, LLP

(57) ABSTRACT

An embodiment server includes a communicator configured to communicate with a personal mobility and a user terminal and a controller configured to control the communicator to transmit a rental permission signal to the personal mobility in response to receiving an authentication completion signal from the user terminal, wherein the authentication completion signal is a signal generated by the user terminal based on biometric information of a user received by the user terminal and registered biometric information stored in the user terminal.

22 Claims, 6 Drawing Sheets

(56) References Cited

U.S. PATENT DOCUMENTS

2019/0176759 A1\* 6/2019 Heinrich ............... B60R 25/245
2019/0193681 A1\* 6/2019 Ito ......................... B60R 25/246
2019/0318419 A1\* 10/2019 VanderZanden ....... G08G 1/205

\* cited by examiner

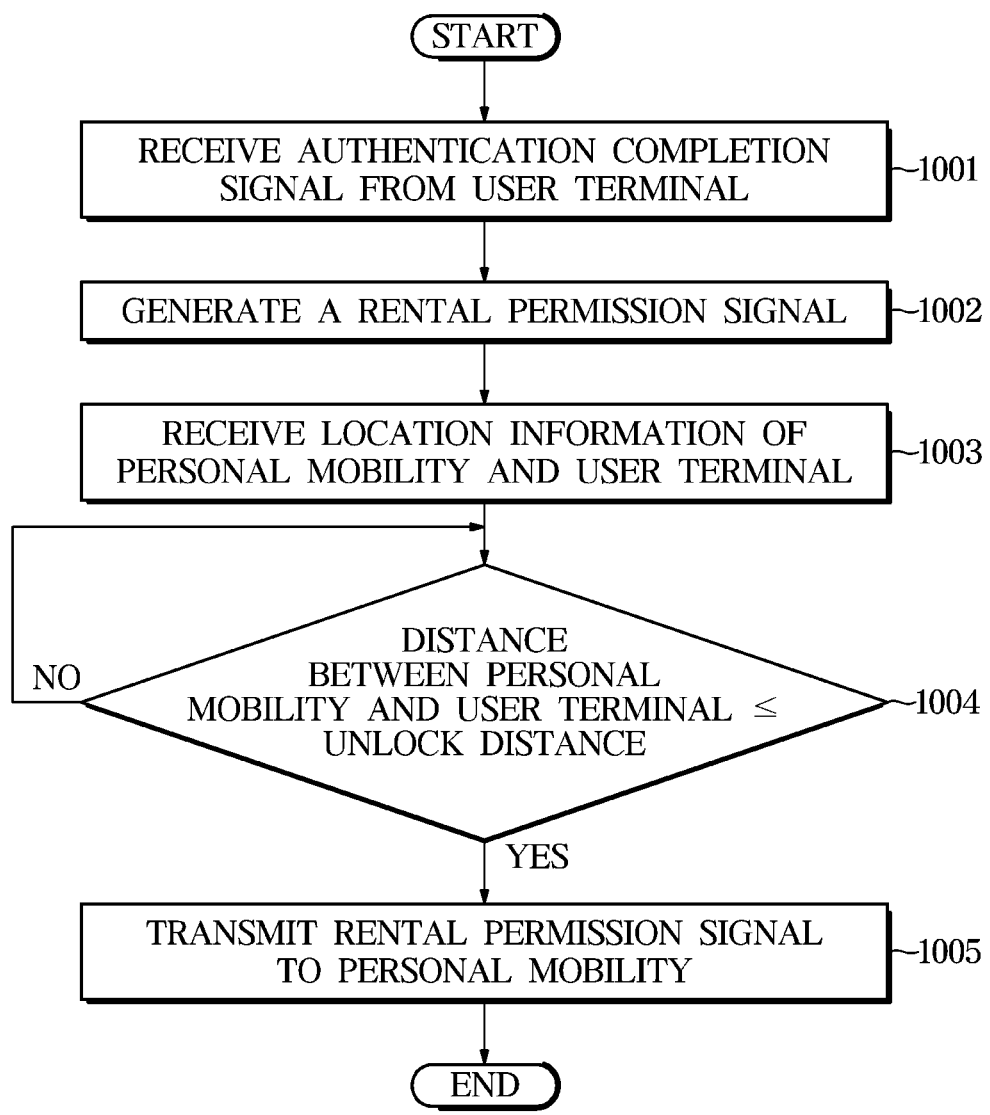

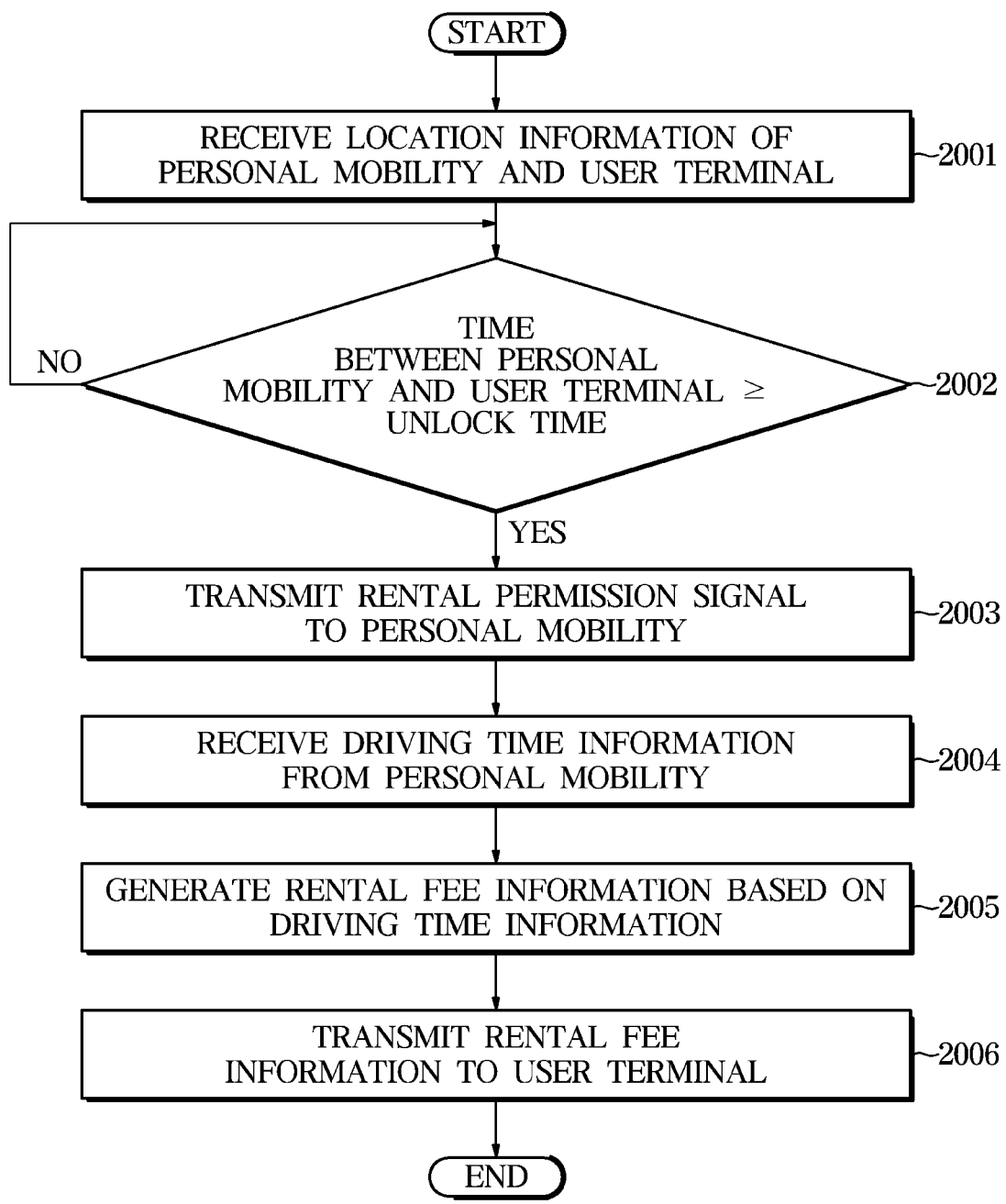

CONTROLLING THE OPERATION OF A PERSONAL MOBILITY IN A RENTAL SERVICE

CROSS-REFERENCE TO RELATED APPLICATIONS

This application claims the benefit of Korean Patent Application No. 10-2020-0129239, filed on Oct. 7, 2020 in the Korean Intellectual Property Office, which application is hereby incorporated herein by reference.

TECHNICAL FIELD

The disclosure relates to a server, a controlling method thereof, and a personal mobility.

BACKGROUND

A personal mobility is a small means of transportation for short and middle distances that combines electric charging and power technologies. The personal mobility is in the spotlight as a means of transportation that is easy to carry and can solve traffic congestion and parking problems. In recent years, as the market for personal mobilities is expanded, the number of users using personal mobilities on the road is increasing.

Such a personal mobility may be owned by individuals, but is also used through rental using shared service. That is, users can rent and use personal mobilities through a shared service.

SUMMARY

The disclosure relates to a server, a controlling method thereof, and a personal mobility. Particular embodiments relate to a server providing a personal mobility service to a commercial user, a controlling method of the server, and a personal mobility.

An embodiment of the disclosure provides a server configured to provide a mobility rental service that does not require the user to operate a user terminal again by allowing the rental of a personal mobility by manipulating the user terminal only once in response to a user who wants to rent a personal mobility being performed by personal authentication, a controlling method of the server, and a personal mobility.

A server according to an embodiment of the disclosure may include a communicator configured to communicate with a personal mobility and a user terminal, and a controller configured to control the communicator to transmit a rental permission signal to the personal mobility in response to receiving an authentication completion signal from the user terminal.

The authentication completion signal may be a signal generated by the user terminal based on biometric information of a user received by the user terminal and registered biometric information stored in the user terminal.

The communicator may receive location information of the personal mobility from the personal mobility and receive location information of the user terminal from the user terminal, and the controller may control the communicator to transmit the rental permission signal to the personal mobility in response to a distance between the personal mobility and the user terminal being less than or equal to an unlock distance.

The user terminal may include a first user terminal and a second user terminal.

The controller may receive the authentication completion signal from the first user terminal and the second user terminal, respectively, and control the communicator to transmit the rental permission signal to the personal mobility in case of the distance between the personal mobility and a terminal which first transmitted the authentication completion signal among the first user terminal and the second user terminal is less than or equal to the unlock distance, in response to the personal mobility being within a candidate determination distance of the first user terminal from the first user terminal and within a candidate determination distance of the second user terminal from the second user terminal.

The candidate determination distance may be a reference distance for determining the personal mobility that is likely to be rented by the user from among the plurality of personal mobilities. The controller may change the candidate determination distance of the user terminal based on a distance between the personal mobility closest to the user terminal and the user terminal.

The controller may decrease the candidate determination distance of the user terminal in response to the distance between the personal mobility closest to the user terminal and the user terminal being decreased.

The controller may control the communicator to transmit location information of the personal mobility to the user terminal, and limit transmission of the location information of the personal mobility to the first user terminal in response to the distance between the personal mobility and the second user terminal that transmitted the authentication completion signal earlier than the first user terminal being less than or equal to the unlock distance.

The controller may control the communicator to transmit a rental end signal to the personal mobility in response to the communicator transmitting the rental permission signal and the distance between the personal mobility and the user terminal being greater than or equal to the unlock distance.

The communicator may receive driving time information generated based on driving time of the personal mobility from the personal mobility, and the controller may control the communicator to generate rental fee information based on the driving time information and transmit the rental fee information to the user terminal.

The biometric information of the user may include at least one of fingerprint recognition information, iris recognition information, and vein recognition information of the user.

A controlling method of a server according to an embodiment of the disclosure may include receiving an authentication completion signal from a user terminal and controlling a communicator to transmit a rental permission signal to a personal mobility.

The authentication completion signal may be a signal generated by the user terminal based on biometric information of a user received by the user terminal and registered biometric information stored in the user terminal.

The controlling method of a server according to an embodiment of the disclosure may further include receiving location information of the personal mobility from the personal mobility and receiving location information of the user terminal from the user terminal.

The controlling the communicator to transmit the rental permission signal to the personal mobility may be controlling the communicator to transmit the rental permission signal to the personal mobility in response to a distance between the personal mobility and the user terminal being less than or equal to an unlock distance.

The user terminal may include a first user terminal and a second user terminal, and the controlling method of a server according to an embodiment of the disclosure may further include receiving the authentication completion signal from the first user terminal and the second user terminal, respectively.

The controlling the communicator to transmit the rental permission signal to the personal mobility may be controlling the communicator to transmit the rental permission signal to the personal mobility in case of the distance between the personal mobility and a terminal which first transmitted the authentication completion signal among the first user terminal and the second user terminal being less than or equal to the unlock distance, in response to the personal mobility being within a candidate determination distance of the first user terminal from the first user terminal and within a candidate determination distance of the second user terminal from the second user terminal.

The controlling method of a server according to an embodiment of the disclosure may further include changing the candidate determination distance of the user terminal based on a distance between the personal mobility closest to the user terminal and the user terminal.

The changing of the candidate determination distance of the user terminal may be decreasing the candidate determination distance of the user terminal in response to the distance between the personal mobility closest to the user terminal and the user terminal being decreased.

The controlling method of the server may further include controlling the communicator to transmit location information of the personal mobility to the user terminal and limiting transmission of location information of the personal mobility to the first user terminal in response to the distance between the personal mobility and the second user terminal that transmitted the authentication completion signal earlier than the first user terminal being less than or equal to the unlock distance.

The controlling method of the server may further include controlling the communicator to transmit a rental end signal to the personal mobility in response to the communicator transmitting the rental permission signal and the distance between the personal mobility and the user terminal being greater than or equal to the unlock distance.

The controlling method of the server may further include receiving driving time information generated based on driving time of the personal mobility from the personal mobility, generating rental fee information based on the driving time information, and controlling the communicator to transmit the rental fee information to the user terminal.

In addition, the biometric information of the user may include at least one of fingerprint recognition information, iris recognition information, and vein recognition information of the user.

A personal mobility according to an embodiment of the disclosure may include a driving module, a communicator configured to communicate with a server, and a processor configured to control the driving module to unlock the personal mobility in response to receiving a rental permission signal from the server.

In addition, the rental permission signal may be a signal generated by the server based on the biometric information of the user received by a user terminal and registered biometric information stored in the user terminal.

The personal mobility may further include a GPS module, the processor may control the communicator to transmit location information of the personal mobility to the server, and the rental permission signal may be a signal generated by the server in response to a distance between the personal mobility and the user terminal being less than or equal to an unlock distance.

The processor may control the driving module to lock the personal mobility in response to receiving a rental end signal from the server, and the rental end signal may be a signal generated by the server in response to the rental permission signal being generated and the distance between the personal mobility and the user terminal being greater than or equal to the unlock distance.

The processor may control the communicator to transmit the driving time information of the personal mobility to the server.

In addition, the biometric information of the user may include at least one of fingerprint recognition information, iris recognition information, and vein recognition information of the user.

BRIEF DESCRIPTION OF THE DRAWINGS

These and/or other embodiments of the present invention will become apparent and more readily appreciated from the following description of the embodiments, taken in conjunction with the accompanying drawings, in which:

FIG. 5 is a flowchart illustrating a procedure for providing a personal mobility rental service according to an embodiment; and FIG. 6 is a flowchart illustrating a procedure in response to a personal mobility rental service being terminated according to an embodiment.

DETAILED DESCRIPTION OF ILLUSTRATIVE EMBODIMENTS

Figure 1:
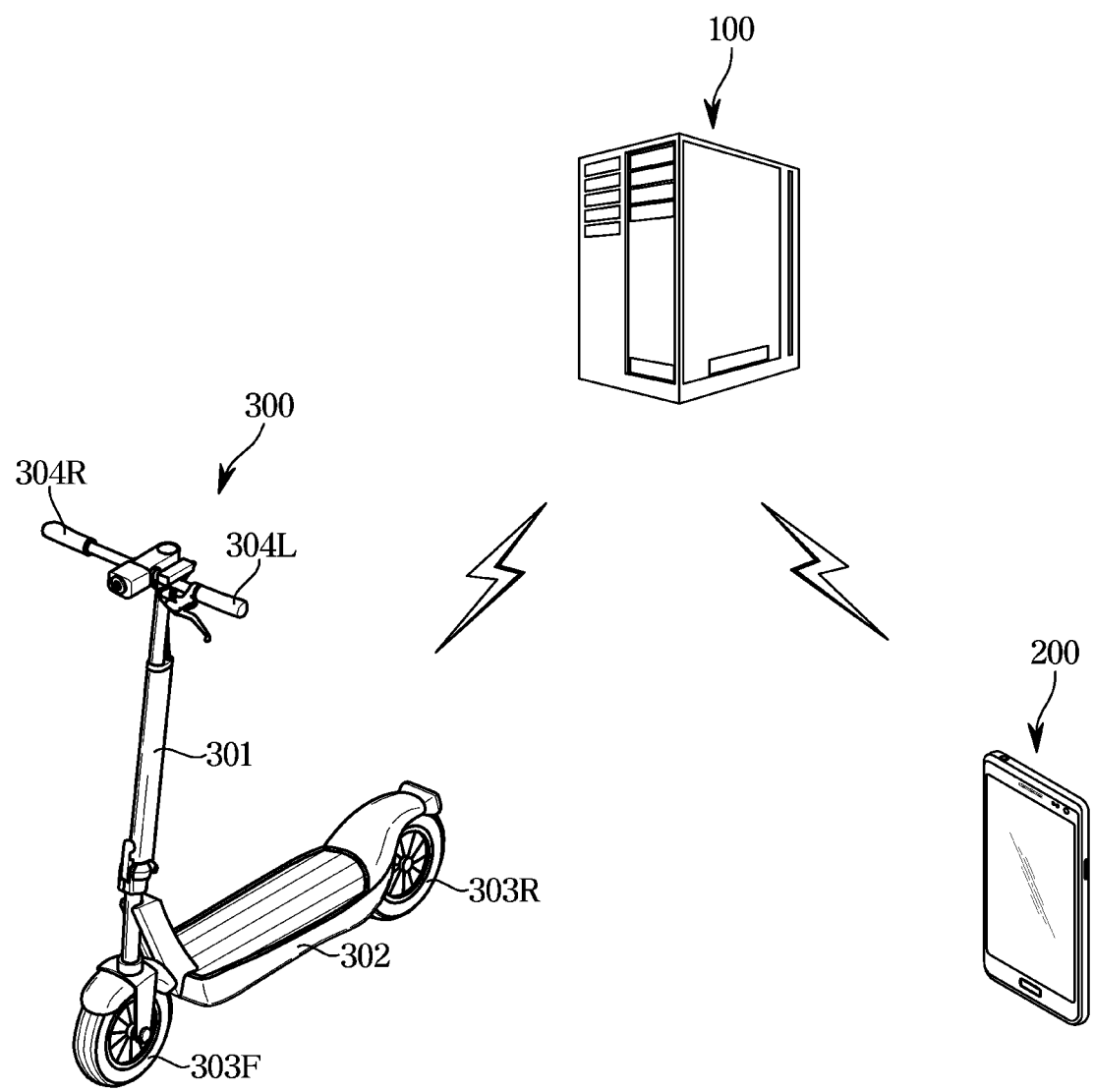
FIG. 1 is a diagram illustrating appearances of a server, a user terminal, and personal mobility according to an embodiment.

Hereinafter, embodiments of the present disclosure will be described in detail with reference to the accompanying drawings. In designating elements of the drawings by reference numerals, the same elements will be designated by the same reference numerals although they are shown in different drawings. Further, in the following description of embodiments of the present disclosure, a detailed description of known functions and configurations incorporated herein will be omitted when it may make the subject matter of the present disclosure rather unclear.

Like numerals refer to like elements throughout the specification. Not all elements of embodiments of the present invention will be described, and description of what are commonly known in the art or what overlap each other in the exemplary embodiments will be omitted. The terms as used throughout the specification, such as "~ part", "~ module", "~ member", "~ block", etc., may be implemented in software or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communicator network.

It will be further understood that the terms "comprises" and/or "comprising," when used in the present specification, identify the presence of stated features, integers, steps, operations, elements, and/or components, but do not preclude the presence or addition of one or more other features, integers, steps, operations, elements, components, and/or groups thereof, unless the context clearly indicates otherwise.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present invention will be described with reference to the accompanying drawings.

In general, in order to use the personal mobility rental service, the user may find out the location of the personal mobility freely parked around by using the application installed on the user terminal, may visit the personal mobility and use the personal mobility rental service by occupying the personal mobility by using a QR code (Quick Response code) method using the user terminal and the like, and may end the use of the rental service by performing payment and settlement through the user terminal again upon arrival at the destination.

Figure 2:
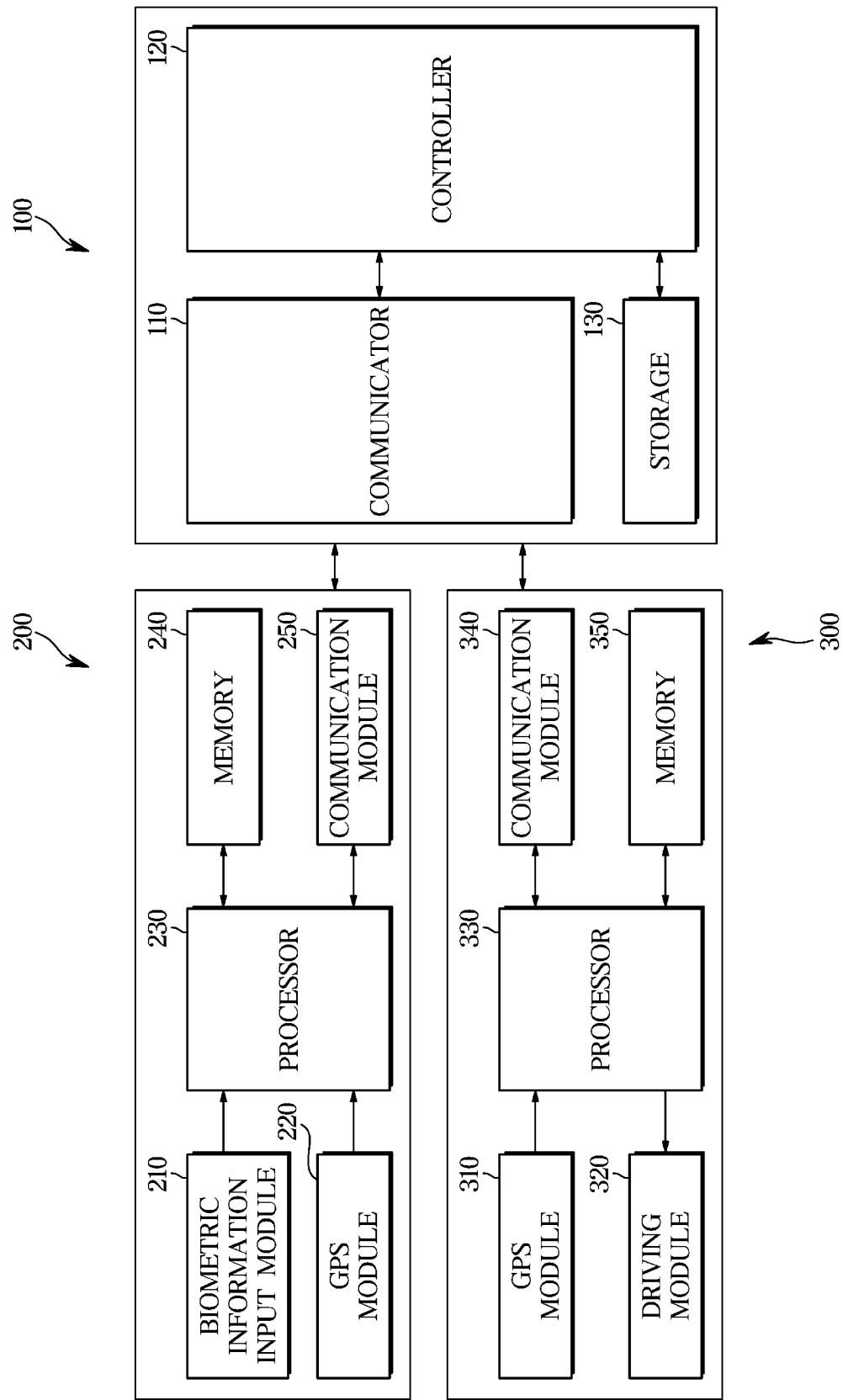
FIG. 2 is a control block diagram of a server, a user terminal, and personal mobility according to an embodiment.

FIG. 1 is a diagram illustrating appearances of a server, a user terminal, and personal mobility according to an exemplary embodiment, and FIG. 2 is a control block diagram of a server, a user terminal, and personal mobility according to an embodiment.

Referring to FIGS. 1 and 2, the user terminal 200 may include biometric information input module 210, a GPS module 220, a processor 230, a memory 240, and a communication module 250. In addition, the personal mobility 300 may include a GPS module 310, a driving module 320, a processor 330, a communication module 340, and a memory 350.

The personal mobility 300 refers to a single-person or two-person small vehicle that may be driven by electric power, such as an electric kickboard, an electric bicycle, and an electric wheel. For a detailed description, in the embodiments to be described later, a case in which the personal mobility 300 is an electric kickboard will be described as an example.

The personal mobility 300 may includes a body 301, a left handle 304L and a right handle 304R provided at the upper end of the body 301, a front wheel 303F provided at the lower end of the body 301, a footrest 302 extending from the lower end of the body 301 to the rear of the front wheel 303F and a rear wheel 303R provided at the rear of the footrest 302.

The driver of the personal mobility 300 may drive while standing on the footrest 302 and holding the left handle 304L and the right handle 304R, and may adjust the driving direction by manipulating the left handle 304L and the right handle 304R.

In addition, the driving module 320 may include a power device, and may include a battery that supplies power to the power device.

In the case of renting a personal mobility, a user may recognize one's own fingerprint, one's own iris, or one's own vein in the biometric information input module 210 for self-authentication. That is, the biometric information input module 210 may receive the biometric information of the user from the user.

The biometric information of the user may be one of fingerprint recognition information, iris recognition information, and vein recognition information of the user.

The fingerprint recognition information may be information on a fingerprint pattern of the user. The iris recognition information may be information obtained by extracting an eye region from a user's face image captured by the camera of the user terminal 200 and then extracting the iris region and encoding data. The vein recognition information may be information on a distribution pattern of blood vessels that can be seen on the user's skin surface.

The biometric information input module 210 may include one of a fingerprint recognition sensor, an iris recognition module, and a vein recognition module.

The fingerprint recognition sensor may collect fingerprint recognition information of the user. The fingerprint recognition sensor may include an optical sensor, an image sensor, and the like, but the types of usable sensors are not limited thereto, and may be a concept including all components capable of recognizing a user's fingerprint pattern.

The iris recognition module may include a light source for illuminating the user's iris and a camera for acquiring light reflected from the user's iris.

The vein recognition module may acquire vein recognition information through light reflected from the body part by scanning a body part such as a user's hand with infrared rays.

The registered biometric information may be information that is a basis for authenticating whether the user is a registered person in the rental service of the personal mobility 300. The registered biometric information may be input by a user to the user terminal 200 in advance through the biometric information input module 210. The processor 230 of the user terminal 200 may store the input registered biometric information in the memory 240 of the user terminal 200.

The processor 230 of the user terminal 200 may generate an authentication completion signal based on the biometric information of the user received by the biometric information input module 210 and the registered biometric information stored in the memory 240 of the user terminal 200. Specifically, the processor 230 of the user terminal 200 may generate an authentication completion signal in response to the biometric information of the user matching the registered biometric information.

The authentication completion signal may be a signal including information that the processor 230 of the user terminal 200 has authenticated the user as a registered person for the rental service.

The processor 230 of the user terminal 200 may control the communication module 250 of the user terminal 200 to transmit an authentication completion signal to a communicator 110 of a server 100.

Referring to FIG. 2, the server 100 according to the disclosed embodiment may include the communicator 110, a controller 120, and a storage 130.

The communicator 110 may transmit various signals and information to the communication module 250 of the user terminal 200 and the communication module 340 of the personal mobility 300 through a wireless communicator network, or receive various signals and information from the communication module 250 of the user terminal 200 or the communication module 340 of the personal mobility 300.

Here, the wireless communicator network means a communicator network capable of transmitting and receiving signals wirelessly. For example, the wireless communicator network includes a 3G communicator network, a 4G communicator network, and a 5G communicator network, but is not limited thereto.

The communicator 110 may transmit signals and information received from the user terminal 200 and the personal mobility 300 to the controller 120. In addition, the communicator 110 may transmit an authentication completion signal received from the user terminal 200 to the controller 120.

In response to receiving the authentication completion signal, the controller 120 may generate a rental permission signal. The rental permission signal may be a signal including information indicating that the personal mobility 300 is allowed to be rented. That is, the rental permission signal may be a signal that is a basis for controlling the personal mobility 300 so that the processor 330 of the personal mobility 300 unlocks the personal mobility 300.

The controller 120 may control the communicator 110 to transmit the rental permission signal to the personal mobility 300.

The communication module 340 of the personal mobility 300 may receive a rental permission signal from the server 100.

At this time, the communication module 340 of the personal mobility 300 may transmit the rental permission signal to the processor 330 of the personal mobility 300.

The processor 330 of the personal mobility 300 may control the driving module 320 to release the lock of the personal mobility 300 in response to receiving the rental permission signal. In this case, the locking of the personal mobility 300 may be a state in which the driving module 320 does not operate even if the user manipulates the personal mobility 300.

In response to the lock of the personal mobility 300 being released, the processor 330 of the personal mobility 300 may control the driving module 320 to perform an operation corresponding to a user's manipulation of the personal mobility 300.

The memory 240 of the user terminal 200, the memory 350 of the personal mobility 300, and the storage 130 may store programs that perform the above-described operations and operations described later.

The processor 230 of the user terminal 200, the processor 330 and the controller 120 of the personal mobility 300 may execute stored programs.

In case of the memory and the processor being provided in plural, they may be integrated on a single chip, or may be provided in physically separate locations.

The memory and the storage may include a volatile memory such as static random access memory (S-RAM) and dynamic random access memory (D-RAM) and the like, for temporarily storing data. In addition, the memory and the storage may include volatile memory such as read only memory (ROM), erasable programmable read only memory (EEPROM) and the like, for storing a control program and control data for a long period of time. The processor and the controller may include various logic circuits and operation circuits, and may process data according to programs provided from a memory and a storage, and generate a control signal according to the processing result.

The GPS module 220 of the user terminal 200 and the GPS module 310 of the personal mobility 300 may receive GPS information transmitted by a GPS satellite.

The GPS module may transmit GPS information to the processor. In response to the GPS module transmitting the GPS information to the processor, the processor may calculate the distance between the satellite and the GPS module by comparing the time information contained in the GPS information transmitted by the GPS satellite and the time at which the GPS module received the GPS information, and determine the current location of the GPS module based on the calculated distance. In this case, the processor may represent the current position of the GPS module as position coordinates in an absolute coordinate system.

In this way, the processor 230 of the user terminal 200 may generate location information of the user terminal 200 based on the received GPS information, and the processor 330 of the personal mobility 300 may generate location information of the personal mobility 300 based on the received GPS information.

Figure 3:
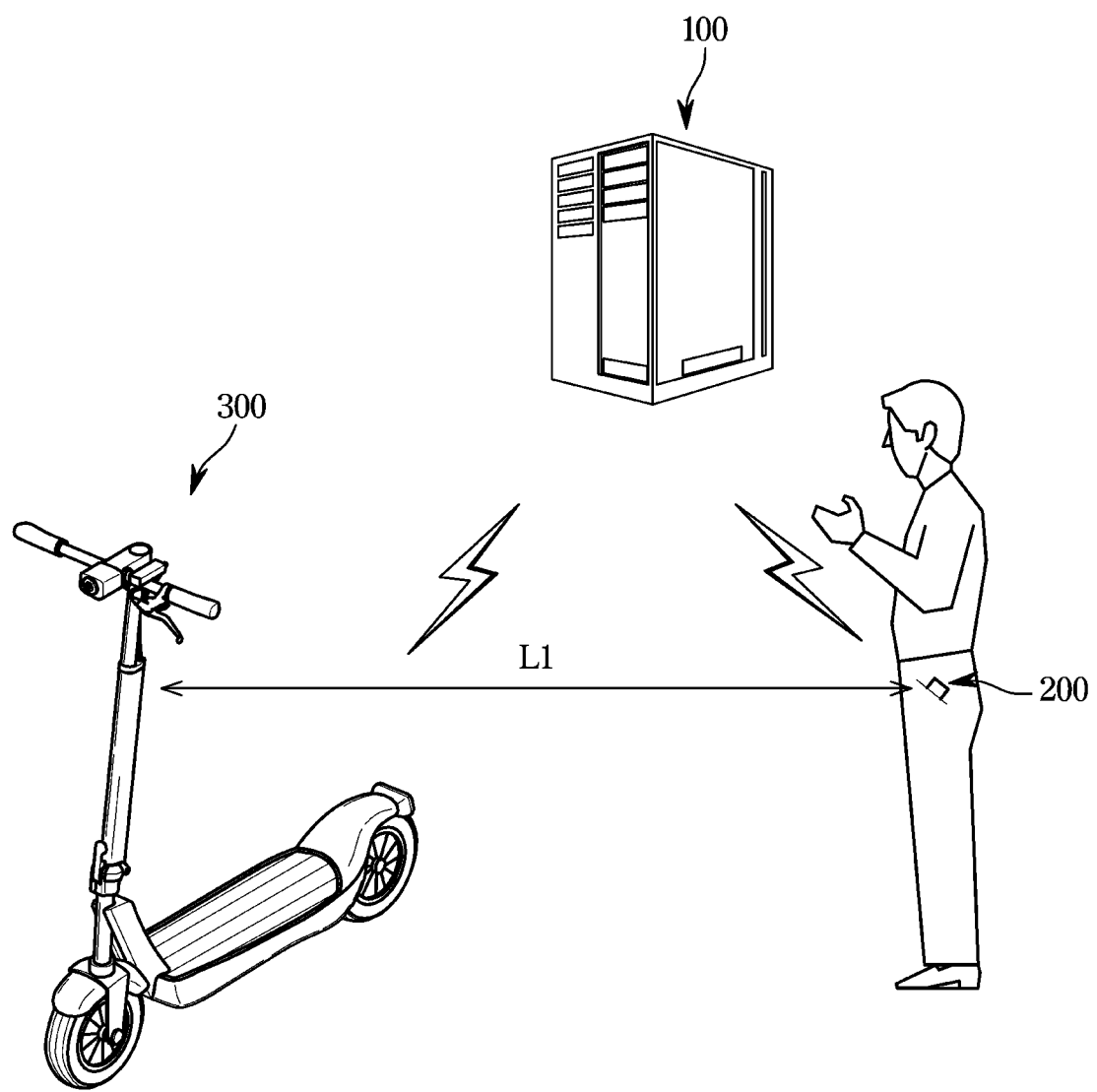
FIG. 3 is a diagram illustrating providing of a personal mobility rental service according to an embodiment.

FIG. 3 is a diagram illustrating providing a personal mobility rental service according to an embodiment.

Referring to FIG. 3, the communicator 110 may receive location information of the personal mobility 300 from the personal mobility 300 and may receive location information of the user terminal 200 from the user terminal 200. In this case, the communicator 110 may transmit the location information of the personal mobility 300 and the location information of the user terminal 200 to the controller.

The controller 120 may determine a distance L1 between the personal mobility 300 and the user terminal 200 based on the received location information of the personal mobility 300 and the location information of the user terminal 200.

The unlock distance may be a distance used as a reference for determining whether the user has approached the specific personal mobility 300 to be rented. The unlock distance may be about 5 m, but is not limited thereto.

In response to the distance L1 between the personal mobility 300 and the user terminal 200 being less than or equal to the unlock distance, the controller 120 may control the communicator 110 to transmit a rental permission signal to the personal mobility 300.

According to the above-described embodiment, the user may be authenticated as a person registered in the rental service through the user terminal 200 within the unlock distance L1 from the personal mobility 300 to be rented.

At this time, the server 100 may generate a rental permission signal based on the authentication completion signal received from the user terminal 200, and at this time, since the distance L1 between the personal mobility 300 and the user terminal 200 is less than or equal to the unlock distance, the server 100 may immediately transmit a rental permission signal to the personal mobility 300 accessed by the user.

According to another embodiment, the user may be authenticated as a person registered in the rental service through the user terminal 200 before accessing the personal mobility 300.

At this time, the server 100 may transmit a rental permission signal to the personal mobility 300 accessed by the user in response to the distance L1 between the personal mobility 300 and the user terminal 200 being less than or equal to the unlock distance, by accessing the personal mobility 300 that the user wants to rent after generating and waiting for a rental permission signal based on the authentication completion signal received from the user terminal 200.

In response to the user being authenticated as a person registered in the rental service through the user terminal 200 before accessing the personal mobility 300, it may be sufficient for the user to use the user terminal 200 only in response to the user being authenticated. That is, as long as the user has the user terminal 200 at the moment of accessing and occupying the personal mobility 300, the user may rent the personal mobility 300.

The controller 120 may generate a rental end signal in response to the communicator 110 transmitting a rental permission signal and the distance L1 between the personal mobility 300 and the user terminal 200 being greater than or equal to the unlock distance. The controller 120 may control the communicator 110 to transmit a rental end signal to the personal mobility 300.

The rental end signal may be a signal including information indicating that the rental of the personal mobility 300 that is providing the rental service is terminated. That is, the rental end signal may be a signal that is a basis for controlling the personal mobility 300 so that the processor 330 of the personal mobility 300 locks the personal mobility 300 again.

The communication module 340 of the personal mobility 300 may receive a rental permission signal from the server 100. At this time, the communication module 340 of the personal mobility 300 may transmit the rental permission signal to the processor 330 of the personal mobility 300.

The processor 330 of the personal mobility 300 may control the driving module 320 to lock the personal mobility 300 again in response to receiving the rental end signal.

The processor 330 of the personal mobility 300 may generate driving time information of the personal mobility 300 based on the driving time of the personal mobility 300, that is, the rented time, in response to receiving the rental end signal from the server 100.

The processor 330 of the personal mobility 300 may control the communication module 340 of the personal mobility 300 to transmit driving time information to the server 100.

The driving time information may include information on the rental time of the personal mobility 300.

In addition, the driving time information may include various information for calculating a rental fee, such as a driving distance of the personal mobility, in addition to the driving time of the personal mobility 300.

The communicator 110 may transmit the received driving time information to the controller 120. The controller 120 may generate rental fee information based on the received driving time information.

The rental fee information may be information including the rental fee of the personal mobility 300 from a response to the server 100 transmitting the rental permission signal until the rental end signal is transmitted.

Figure 4:
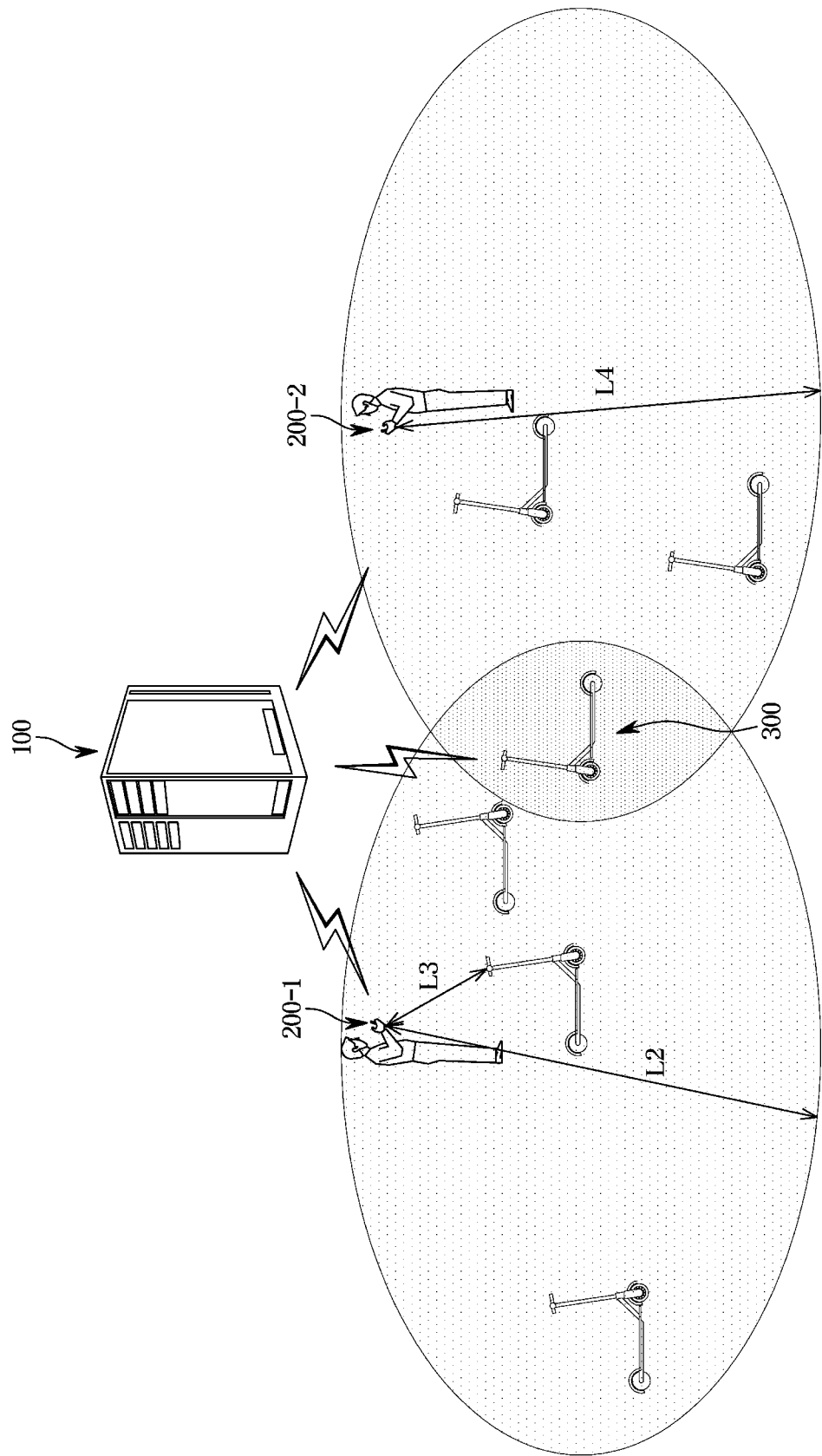
FIG. 4 is a diagram illustrating a case in which a personal mobility is within each candidate determination distance from a first user terminal and a second user terminal, according to an embodiment.

FIG. 4 is a diagram illustrating a case in which a personal mobility is within each candidate determination distance from a first user terminal and a second user terminal, according to an embodiment.

Referring to FIG. 4, the first user terminal 200-1 and the second user terminal 200-2 may be user terminals possessed by different users.

The candidate determination distance may be a distance used as a reference for determining the personal mobility 300 that a user may rent from among the plurality of personal mobilities 300. That is, the personal mobility 300 within the candidate determination distance from the user terminal 200 may be the personal mobility 300 that is likely to be rented by a user. However, it may not necessarily be possible to rent the personal mobility 300 within the candidate determination distance by the user.

A candidate determination distance L2 of the first user terminal 200-1 and a candidate determination distance L4 of the second user terminal 200-2 may be different from each other.

The controller 120 may have received an authentication completion signal from the first user terminal 200-1 and the second user terminal 200-2, respectively.

The personal mobility 300 may be within the candidate determination distance L2 of the first user terminal 200-1 from the first user terminal 200-1, and within the candidate determination distance L4 of the second user terminal 200-2 from the second user terminal 200-2.

The controller 120 may control the communicator 110 to transmit the rental permission signal to the personal mobility 300 in response to the distance L1 between the personal mobility 300 and the user terminal which first transmitted the authentication completion signal among the first user terminal 200-1 and the second user terminal 200-2 being less than or equal to the unlock distance.

For example, the controller 120 may not transmit the rental permission signal to the personal mobility 300, even if the distance L1 between the second user terminal 200-2 and the personal mobility 300 is less than or equal to the unlock distance, in response to the first user terminal 200-1 transmitting the authentication completion signal before the second user terminal 200-2.

On the other hand, in this case, in response to the distance L1 between the first user terminal 200-1 and the personal mobility 300 being less than or equal to the unlock distance, the controller 120 may transmit a rental permission signal to the personal mobility 300.

According to the above-described embodiment, in response to the personal mobility 300 being in a location where it is likely to be rented from a plurality of users, the rental of the personal mobility 300 may be allowed to a user who has authenticated first as a registered person for the rental service through a user terminal.

At this time, the controller 120 may control the communicator 110 to transmit information recommending the personal mobility 300 outside the candidate determination distance of the user terminal 200 that has authenticated first, to the user terminal 200 that has completed authentication late.

For example, in response to the first user terminal 200-1 transmitting an authentication completion signal before the second user terminal 200-2, the controller 120 may control the communicator 110 to transmit information recommending rental of the personal mobility 300 outside the candidate determination distance L2 of the first user terminal 200-1 from the first user terminal 200-1, to the second user terminal 200-2.

In response to the user terminal 200, which has completed authentication first, approaching a certain personal mobility within the unlocked distance, the controller 120 may allow rental of the remaining personal mobility 300 even if the user has completed authentication late.

For example, in response to the distance L1 between the first user terminal 200-1 that has completed authentication first and a certain personal mobility being less than or equal to the unlock distance, the controller 120 may transmit a rental permission signal to the personal mobility 300, in response to the second user terminal 200-2, which has completed authentication late, approaching the personal mobility 300 within the candidate determination distance L2 of the first user terminal 200-1 within the unlock distance from the first user terminal 200-1.

Meanwhile, the preset time may be a maximum time during which the user may complete the authentication and rent the personal mobility 300 without having to perform authentication again.

That is, in response to a preset time elapsing from the time biometric authentication is completed through the user terminal 200, the user may be able to rent the personal mobility 300 only by performing authentication through the user terminal 200 again.

In response to the user who has completed authentication first not occupying any personal mobility 300 within a preset time, the controller 120 may allow rental of the personal mobility 300 within a candidate determination distance from the user terminal 200 that has completed authentication first, even if the user has completed authentication late.

On the other hand, unlike the above-described embodiment, priority for first lending the personal mobility 300 within each candidate determination distance from the plurality of user terminals 200 may not always be given through the user terminal 200 that has completed authentication first. For example, priority may be given to the user terminal 200 that pays more rental service usage fees.

The controller 120 may change the candidate determination distance L2 of the user terminal 200 based on the distance L3 between the personal mobility closest to the user terminal 200 and the user terminal 200.

Specifically, in response to the distance L3 between the personal mobility closest to the user terminal 200 and the user terminal 200 increasing, the candidate determination distance L2 of the user terminal 200 may increase in proportion thereto, and in response to the distance L3 between the personal mobility closest to the user terminal 200 and the user terminal 200 decreasing, the candidate determination distance L2 of the user terminal 200 may decrease in proportion thereto.

That is, because it can be seen that the intention of the user to rent the nearest personal mobility 300 increases in response to the user terminal 200, which has completed authentication through the user terminal 200, approaching the nearest personal mobility 300, it may be said to reduce a candidate determination distance, which is a distance that is a reference distance for determining the personal mobility 300 that may be rented out of the plurality of personal mobilities 300.

The controller 120 may control the communicator 110 to transmit location information of the personal mobility 300 to the user terminal 200. In this case, the processor 230 of the user terminal 200 may control the display to display the received location information of the personal mobility 300.

The controller 120 may limit transmission of the location information of the personal mobility 300 to the first user terminal 200-1 in response to the distance L1 between the personal mobility 300 and the second user terminal 200-2 that transmitted the authentication completion signal prior to the first user terminal 200-1 being less than or equal to the unlock distance.

That is, this may be to limit the user of the first user terminal 200-1 that the user of the first user terminal 200-1 can find out the location of the personal mobility 300 occupied by the user of the second user terminal 200-2. In addition, this may be for preventing a user from going to a location of the personal mobility 300 that has already been occupied by another user.

FIG. 5 is a flowchart illustrating a procedure for providing a personal mobility rental service according to an embodiment. This is only a preferred embodiment, and of course, some configurations may be added or deleted as necessary.

Referring to FIG. 5, the communicator 110 may receive an authentication completion signal from the user terminal 200 (1001). In this case, the authentication completion signal may be a signal generated by the processor 230 of the user terminal 200 in response to the user terminal 200 comparing and matching the input biometric information of the user and the registered biometric information stored in the user terminal 200.

The communicator 110 may transmit an authentication completion signal to the controller 120. The controller 120 may generate a rental permission signal in response to receiving the authentication completion signal (1002). In this case, the rental permission signal may be a signal including information that permits rental of the personal mobility 300.

The communicator 110 may receive location information of the personal mobility 300 from the personal mobility 300 and may receive location information of the user terminal 200 from the user terminal 200 (1003). At this time, the location information of the user terminal 200 may be information generated by the processor 230 of the user terminal 200 based on GPS information, and the location information of the personal mobility 300 may be information generated by the processor 330 of the personal mobility 300 based on GPS information.

The communicator 110 may transmit location information of the personal mobility 300 and location information of the user terminal 200 to the controller 120. The controller 120 may determine the distance L1 between the personal mobility 300 and the user terminal 200 based on the received location information of the personal mobility 300 and the location information of the user terminal 200.

The controller 120 may determine whether the distance L1 between the personal mobility 300 and the user terminal 200 is less than or equal to the unlock distance (1004).

The controller 120 may wait until the distance L1 between the personal mobility 300 and the user terminal 200 becomes less than or equal to the unlock distance in response to the distance L1 between the personal mobility 300 and the user terminal 200 being not less than or equal to the unlock distance ('No' in 1004).

At this time, the controller 120 may end the procedure of lending the personal mobility 300 service in response to the distance L1 between the personal mobility 300 and the user terminal 200 being not less than or equal to the unlock distance from the time of response to biometric authentication being completed through the user terminal 200 until a preset time elapses. In this case, the user may be able to rent the personal mobility 300 by performing authentication through the user terminal 200 again.

The controller 120 may control the communicator 110 to transmit the rental permission signal to the personal mobility 300 in response to the distance L1 between the personal mobility 300 and the user terminal 200 being less than or equal to the unlock distance ('Yes' in 1004).

The communicator 110 may transmit a rental permission signal to the personal mobility 300 (1005).

FIG. 6 is a flowchart illustrating a procedure in response to a personal mobility rental service being terminated according to an embodiment.

Referring to FIG. 6, the communicator 110 may receive the location information of the personal mobility 300 from the personal mobility 300 and receive the location information of the user terminal 200 from the user terminal 200, while the personal mobility 300 is being rented (2001).

The controller 120 may determine whether the distance L1 between the personal mobility 300 and the user terminal 200 is greater than or equal to the unlock distance while the personal mobility 300 is being rented (2002).

In response to the user being finished using the personal mobility 300 rental service, the user may move away from the personal mobility 300 while holding the user terminal 200. In this case, the distance L1 between the personal mobility 300 and the user terminal 200 may increase.

In response to the distance L1 between the personal mobility 300 and the user terminal 200 being less than the unlock distance, the user may still be using a rental service in the vicinity of the personal mobility 300 being rented ('No' in 2002).

In response to the distance L1 between the personal mobility 300 and the user terminal 200 being greater than or equal to the unlock distance, the controller 120 may control the communicator 110 to generate a rental end signal and transmit the rental end signal to the personal mobility 300 ('Yes' in 2002).

The communicator 110 may transmit the rental end signal to the personal mobility 300 (2003). At this time, the processor 330 of the personal mobility 300 may control the driving module 320 to lock the personal mobility 300 in response to receiving the rental end signal.

Also, the processor 330 of the personal mobility 300 may generate driving time information based on the driving time of the personal mobility 300. The processor 330 of the personal mobility 300 may control the communicator module 340 of the personal mobility 300 to transmit the generated driving time information to the server 100.

The communicator 110 may receive driving time information from the personal mobility 300 (2004). In this case, the communicator 110 may transmit the driving time information to the controller 120.

The controller 120 may generate rental fee information based on the driving time information (2005). In this case, the rental fee information may be information including the rental cost of the personal mobility 300 from the server 100 transmitting the rental permission signal until the rental end signal is transmitted.

The controller 120 may control the communicator 110 to transmit the rental fee information to the user terminal 200 (2006).

According to an embodiment of the disclosure, once the user completes the authentication through the user terminal and accesses the personal mobility to be rented with the user terminal in hand, a server providing a rental service capable of lending a personal mobility, a controlling method of the server, and a personal mobility can be provided.

According to an embodiment of the disclosure, since authentication using biometric information of the user is performed by the user terminal rather than the server, a server providing a rental service capable of protecting personal information, a controlling method of the server, and a personal mobility can be provided.

Although exemplary embodiments of the present invention have been described for illustrative purposes, those skilled in the art will appreciate that various modifications, additions and substitutions are possible, without departing from the scope and spirit of the present invention. Therefore, exemplary embodiments of the present invention have not been described for limiting purposes.

What is claimed is:

1. A server comprising:
a communicator configured to:
   communicate with a personal mobility, a first user terminal, and a second user terminal;
   receive location information of the personal mobility from the personal mobility;
   receive location information of the first user terminal from the first user terminal;
   receive location information of the second user terminal from the second user terminal; and
   transmit a rental permission signal to the personal mobility, the rental permission signal being a control signal to control unlocking the personal mobility so that the personal mobility will be unlocked in response to receiving the rental permission signal; and
a controller configured to:
   receive an authentication completion signal from the first user terminal and the second user terminal, respectively, wherein the authentication completion signal is a signal generated by the respective user terminal based on biometric information of a user received by the respective user terminal and registered biometric information stored in the respective user terminal;
   receive location information of the personal mobility from the communicator;
   receive location information of the first user terminal from the communicator;
   receive location information of the second user terminal from the communicator;
   control the communicator to transmit the rental permission signal to the personal mobility to unlock the personal mobility, the rental permission signal being transmitted in response to receiving the authentication completion signal from the first and second user terminals when a distance between the personal mobility and the respective user terminal that first transmitted the authentication completion signal among the first user terminal and the second user terminal is less than or equal to an unlock distance and when the personal mobility is within a first candidate determination distance from the first user terminal and within a second candidate determination distance from the second user terminal, wherein the first candidate determination distance corresponds to the first user terminal and the second candidate determination distance corresponds to the second user terminal;
   decrease the first candidate determination distance based on the distance between the first user terminal and the personal mobility closest to the first user terminal; and
   decrease the second candidate determination distance based on the distance between the second user terminal and the personal mobility closest to the second user terminal.

2. The server according to claim 1, wherein the controller is configured to decrease the first candidate determination distance in response to the distance decreasing between the first user terminal and the personal mobility closest to the first user terminal, and to decrease the second candidate determination distance in response to the distance decreasing between the second user terminal and the personal mobility closest to the second user terminal.

3. The server according to claim 1, wherein the controller is configured to:
control the communicator to transmit the location information of the personal mobility to the second user terminal; and
limit transmission of the location information of the personal mobility to the first user terminal in response to the distance between the personal mobility and the second user terminal that transmitted the authentication completion signal earlier than the first user terminal being less than or equal to the unlock distance.

4. The server according to claim 1, wherein the controller is configured to control the communicator to transmit a rental end signal to the personal mobility in response to the communicator transmitting the rental permission signal and the distance between the personal mobility and the respective user terminal that first transmitted the authentication being greater than or equal to the unlock distance.

5. The server according to claim 4, wherein:
the communicator is configured to receive driving time information generated based on driving time of the personal mobility from the personal mobility; and
the controller is configured to control the communicator to generate rental fee information based on the driving time information and transmit the rental fee information to the first user terminal or the second user terminal.

6. The server according to claim 1, wherein the biometric information of the user includes fingerprint recognition information, iris recognition information, or vein recognition information of the user.

7. The server according to claim 1, wherein the biometric information of the user includes fingerprint recognition information.

8. The server according to claim 1, wherein the biometric information of the user includes iris recognition information.

9. The server according to claim 1, wherein the biometric information of the user includes vein recognition information of the user.

10. A method comprising:
receiving an authentication completion signal from a first user terminal and a second user terminal, wherein the authentication completion signal is generated by the respective user terminal based on biometric information of a user received by the respective user terminal and registered biometric information stored in the respective user terminal;
receiving location information of a personal mobility from the personal mobility;
receiving location information of the first user terminal from the first user terminal;
receiving location information of the second user terminal from the second user terminal;
transmitting a rental permission signal to the personal mobility to unlock the personal mobility, the rental permission signal being transmitted in response to receiving the authentication completion signal from the first and second user terminals when a distance between the personal mobility and the respective user terminal that first transmitted the authentication completion signal among the first user terminal and the second user terminal is less than or equal to an unlock distance and when the personal mobility is within a first candidate determination distance from the first user terminal and within a second candidate determination distance from the second user terminal, wherein the first candidate determination distance corresponds to the first user terminal and the second candidate determination distance corresponds to the second user terminal, wherein the rental permission signal is a control signal to unlock the personal mobility, and wherein the personal mobility is unlocked in response to receiving the rental permission signal;
decreasing the first candidate determination distance based on the distance between the first user terminal and the personal mobility closest to the first user terminal; and
decreasing the second candidate determination distance based on the distance between the second user terminal and the personal mobility closest to the second user terminal.

11. The method according to claim 10, further comprising:
transmitting the location information of the personal mobility to the second user terminal; and
limiting transmission of the location information of the personal mobility to the first user terminal in response to the distance between the personal mobility and the second user terminal that transmitted the authentication completion signal earlier than the first user terminal being less than or equal to the unlock distance.

12. The method according to claim 10, further comprising:
transmitting the location information of the personal mobility to the second user terminal; and
transmitting a rental end signal to the personal mobility in response to transmitting the rental permission signal and the distance between the personal mobility and the respective user terminal that first transmitted the authentication being greater than or equal to the unlock distance.

13. The method according to claim 12, further comprising:
receiving driving time information generated based on driving time of the personal mobility from the personal mobility;
generating rental fee information based on the driving time information;
transmitting the location information of the personal mobility to the second user terminal; and
transmitting the rental fee information to the first user terminal or the second user terminal.

14. The method according to claim 10, wherein the biometric information of the user includes fingerprint recognition information, iris recognition information, or vein recognition information of the user.

15. The method according to claim 10, wherein the biometric information of the user includes fingerprint recognition information.

16. The method according to claim 10, wherein the biometric information of the user includes iris recognition information.

17. The method according to claim 10, wherein the biometric information of the user includes vein recognition information of the user.

18. A method comprising:
receiving an authentication completion signal from a first user terminal and a second user terminal, wherein the authentication completion signal is generated by the respective user terminal based on biometric information of a user received by the respective user terminal and registered biometric information stored in the respective user terminal;

receiving location information of a personal mobility from the personal mobility;

receiving location information of the first user terminal from the first user terminal;

receiving location information of the second user terminal from the second user terminal;

unlocking the personal mobility by transmitting a rental permission signal to the personal mobility in response to receiving the authentication completion signal from the first and second user terminals when a distance between the personal mobility and the respective user terminal that first transmitted the authentication completion signal among the first user terminal and the second user terminal is less than or equal to an unlock distance and when the personal mobility is within a first candidate determination distance from the first user terminal and within a second candidate determination distance from the second user terminal, wherein the first candidate determination distance corresponds to the first user terminal and the second candidate determination distance corresponds to the second user terminal;

decreasing the first candidate determination distance in response to the distance decreasing between the first user terminal and the personal mobility closest to the first user terminal; and decreasing the second candidate determination distance in response to the distance decreasing between the second user terminal and the personal mobility closest to the second user terminal.

19. The method according to claim 18, further comprising:

transmitting the location information of the personal mobility to the second user terminal; and limiting transmission of the location information of the personal mobility to the first user terminal in response to the distance between the personal mobility and the second user terminal that transmitted the authentication completion signal earlier than the first user terminal being less than or equal to the unlock distance.

20. The method according to claim 18, further comprising transmitting a rental end signal to the personal mobility in response to transmitting the rental permission signal and the distance between the personal mobility and the respective user terminal that first transmitted the authentication being greater than or equal to the unlock distance.

21. The method according to claim 20, further comprising:

receiving driving time information generated based on driving time of the personal mobility from the personal mobility;

generating rental fee information based on the driving time information; and transmitting the rental fee information to the first user terminal or the second user terminal.

22. The method according to claim 18, wherein the biometric information of the user includes fingerprint recognition information, iris recognition information, or vein recognition information of the user.

* * * * *